United States Patent [19]

Coletti et al.

[11] Patent Number: 5,257,848
[45] Date of Patent: Nov. 2, 1993

[54] TRUCK ACCESSORY SUPPORT

[76] Inventors: John J. Coletti; Joseph Coletti, both of 5722 Skylite, Shelby Township, Mich. 48316

[21] Appl. No.: 945,676

[22] Filed: Sep. 16, 1992

[51] Int. Cl.⁵ .............................................. B60P 3/42
[52] U.S. Cl. ..................... 296/156; 296/39.2; 296/100
[58] Field of Search .................. 296/156, 164–167, 296/39.2, 100

[56] References Cited

U.S. PATENT DOCUMENTS

| | | | |
|---|---|---|---|
| 3,321,233 | 2/1967 | Davis | 296/165 |
| 3,475,048 | 10/1969 | McNamee | 296/164 |
| 3,508,787 | 4/1970 | Strong et al. | 296/100 |
| 3,897,100 | 7/1975 | Gardner | 296/100 X |
| 3,926,469 | 12/1975 | Ulics | 296/167 |
| 3,951,447 | 4/1976 | Sharp | 296/100 X |
| 4,627,655 | 12/1986 | Collins | 296/167 |
| 4,648,649 | 3/1987 | Beal | 296/156 |
| 4,815,787 | 3/1989 | Hale | 296/167 |
| 4,832,396 | 5/1989 | Moreno et al. | 296/164 |
| 5,058,652 | 10/1991 | Wheatley et al. | 296/100 |

Primary Examiner—Robert R. Song
Attorney, Agent, or Firm—Brooks & Kushman

[57] ABSTRACT

A modular support for providing a protective seal between guide rails and a truck accessory. The support comprising an elongated cross member having a substantially horizontal body portion and a latch portion. Modular support further comprising a pair of elongated longitudinal members including a horizontal body portion and a latch portion.

13 Claims, 2 Drawing Sheets

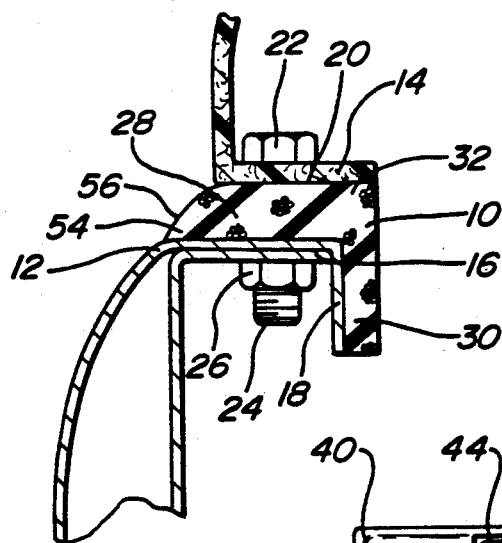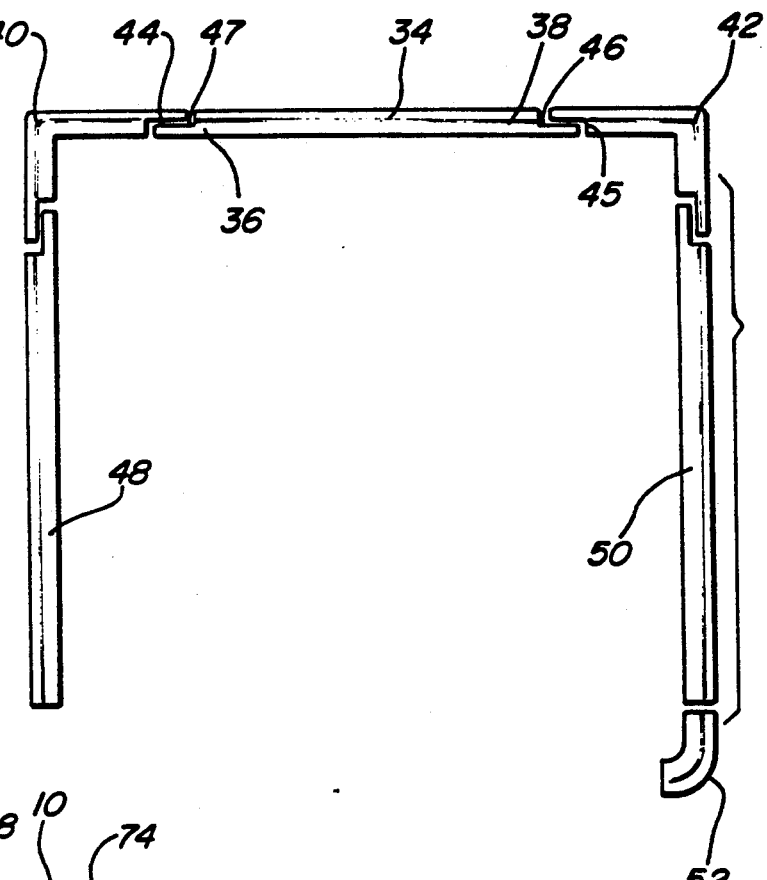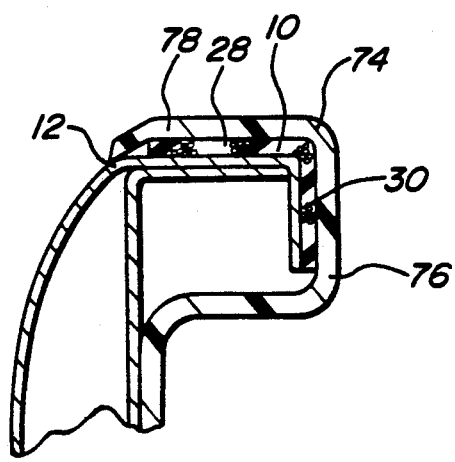

_

TRUCK ACCESSORY SUPPORT

TECHNICAL FIELD

This invention relates generally to a modular support for sealing various truck accessories such as a truck cap or a truck bedliner to the truck bed rail of a pick-up truck. More particularly, the invention relates to an improved design for a foam rubber support having a horizontal body portion and a latch portion, installed between the truck rail and truck accessory.

BACKGROUND ART

The increasing popularity of pick-up trucks is largely attributable to the usefulness of the open storage space provided in the rear of the vehicle. It is often desirable to enclose this open space to make the vehicle better suited for business as well as recreational purposes. Structures such as truck caps covering the beds of pick-up trucks are well known. Various problems arise in coupling the truck caps to the truck bed. First, due to imprecise dimensional connections between the truck rail and truck cap, precipitation such as rain, snow or sleet may accumulate on the cap and leak into the pick-up bed storage area through that portion of the truck cap that fails to contact the truck rail. Often, water leaking into the truck bed may damage cargo that is transported there.

Second, vibrations resulting from routine operation of the vehicle over various road conditions are transferred to the truck cap and have been known to the cap to scratch the truck rail. It has become known in the art to make use of a thin sealing material made of foam rubber or the like disposed between the truck cap and truck rail. This sealing material minimizes the possibility of damage either to the cargo from water ingress or to the truck itself by rust proliferation caused by water collection in the truck bed. The sealing material also reduces damage to the truck rail caused by abrading motion of the truck cap during operation.

U.S. Pat. No. 4,815,787 issued to Hale, for example, discloses a U-shaped seal disposed between the truck rails, an attachment fixture, and a truck cap. The seal is compressibly engaged between the truck rail and the attachment fixture The seal is adhesively secured to both the underside of the attachment fixture and/or to the truck rail.

Similarly, U.S. Pat. No. 3,387,100 issued to Gardner discloses a means for mounting a truck body cover to a truck bed. The Gardner patent shows a weather stripping seal comprised of vinyl, plastic or rubber disposed between the truck cap and truck rail. This weather stripping, as discussed in the Gardner patent, provides a tight weather seal between the truck rail and the truck cap.

In addition to the patents cited above, it is known in the art to utilize an adhesive foam tape for sealing the truck cap to the truck rails. This adhesive foam tape is either pressed on the truck rail mounting portions with the adhesive portion affixed to the truck rail mounting portion or pressed on the connecting portion of the truck cap. It is then necessary to trim the excess foam tape portions after connecting the truck bed cap to the truck rails with the foam insert in place.

The various truck bed seals disclosed in the prior art suffer from numerous problems associated with their continued use over time. For example, when transporting oversize cargo, i.e. cargo which does not fit within the confines of the cap and truck bed area, the truck cap must be removed from the rails. Typically, this entails the removal of various bolts, screws or other fastening means along with the corresponding cap sealer.

In cases where self adhering foam strips have been utilized as weather proofing sealant, these adhesives, upon prolonged compression, often become permanently affixed to either the truck rail mounting portion or the truck cap. Thus, upon removal of the truck cap, it is often found that partial segments of the cap sealer are left either on the truck rail mounting portion or on the truck cap connecting portion. These partial segments are aesthetically unappealing and detract from the overall function and appearance of the vehicle. Indeed, those skilled in the art will recognize that these partial segments must be completely removed from the truck rail mounting portions before the truck cap may be reattached.

In addition to the segmenting problem above, the weather stripping of the prior art, if not properly affixed between the truck cap and truck rails in the installation proceeding has also been found to shift relative positions in relation to the truck rails. In such cases, the weather proof sealing action of the cap sealer is diminished thus permitting water to be transported to the inside of the cargo portion of the truck bed via the non-sealed areas.

The increased popularity of light duty and medium duty trucks has produced various truck accessories which may be utilized with such vehicles. One such accessory, truck bed liners, are often comprised of a plastic material, and are inserted immediately adjacent the truck bed. Truck bed liners are utilized to insulate the lower cargo portions of the truck bed from abrasions caused by the shifting cargo carried in the truck bed. Truck bed liners are designed to follow the entire contour of the inside of the truck bed, including a front wall, a pair of side walls and a bottom wall. A pair of liner side walls extend up and sometimes over the upper portions of the truck rails.

Frequent travel on gravel roads creates vibrational movements not only in truck caps but in truck bed liners. Relative movements between the truck liner and the truck bed walls and truck rails is known to scratch and/or abrade paint off the walls and rails of the truck. To avoid scratching, those skilled in the art have utilized adhesive foam strips in the same manner discussed above to inhibit relative movement between the truck liner and bed walls. Specifically, it is known in the prior art to affix a self-adhesive foam strip on the inner portion of the truck rails prior to installation of the truck bed liner. As in the case of the truck caps, however, the continued use of adhesive stripping also results in segmenting upon removal.

Another truck accessory popular with today's light duty and medium duty truck owners is a rear truck box or rear truck tool box assembly. This rectangular storage box often extends across the width of the truck bed. Attachment flanges extend from the upper portions of the truck box and are utilized to support or fasten the truck box to the truck rail. These truck boxes are often filled with various mechanical and power tools. The utilization of a support of the present invention between the extending flange portions of the truck box and the truck rails protects the truck rails from paint scratches and abrasions through normal use.

SUMMARY OF THE INVENTION

In accordance with the present invention, a modular support is provided which seals the space between truck accessories and truck rail. The modular support protects the inside of the truck bed from precipitation leakage and minimizes damage to the truck that occurs due to vibrational movements of the accessory during routine driving.

A foam rubber modular support is formed by the inter-connection of various independent supports. The supports are installed between the connecting portion of the truck accessory and the corresponding truck rails.

The support of the present invention is configured such that an elongated cross member is included having a first end and a second end. A pair of elongated longitudinal members are adapted to engage the elongated cross member at the first and second ends. The pair of longitudinal members include a horizontal body portion and a latch portion. The horizontal body portion and latch portions may be connected at a common corner portion and are configured such that when the support is disposed on the truck rails between the truck accessory, the latch portion extends downward away from the horizontal body portion adjacent the truck rail side walls.

Accordingly, it is a general object of the present invention to provide a modular support that protects the truck rails from vibrational abrasion damage and also acts as a weather proof seal between the truck accessory and inside of the truck bed.

Another object of the present invention is to provide a modular support that requires no adhesive material to locate the support upon the truck rails upon installation.

It is still another object of the present invention to provide a modular support that is easily removable from the truck bed accessory and truck rails upon temporary removal or replacement of the truck bed accessory.

It is still yet another object of the present invention to provide a modular support that includes a horizontal body portion that when operatively disposed between the truck bed accessory and truck rails is visually noticeable.

It is a further object of the present invention to provide a modular support that extends between the truck rails and the truck cap connecting portion and also extends down into the truck bed to effectuate a more complete weather proofing seal.

It is a still further object of the present invention to provide a modular support that includes a pair of elongated longitudinal members that have tail gate connecting portions that follow the contour of the end portions of the truck rails.

It is still yet a further object of the present invention to provide a modular support that includes an inter-connecting system between its independent portions that includes mating notches that provide an improved water sealing mating effect upon fastening compression of the truck bed accessory support and truck rails.

Additional objects, advantages, and features of the present invention will become more apparent from the following description and appended claims, taken in conjunction with the accompanying drawings.

BRIEF DESCRIPTION OF THE DRAWINGS

FIG. 1 is a partial cross-sectional view of the truck guide rail, support and truck cap;

FIG. 2 is the top view of one embodiment of the present invention wherein a plurality of independent, modular supports make up an entire support assembly and showing one tailgate end portion;

FIG. 3 is a partial cross-sectional view of a truck guide rail, a support and a bed liner;

BEST MODE FOR CARRYING OUT THE INVENTION

Figure 4:
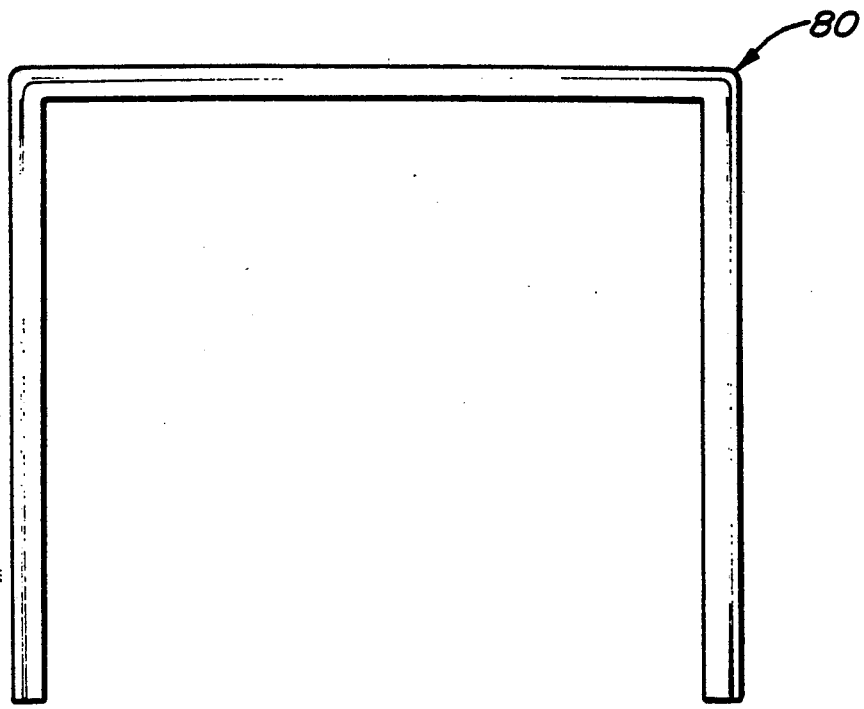
FIG. 4 is a top view of another embodiment of the present invention wherein the support is one integral piece.

As shown in FIG. 1, the support 10 of the present invention is shown disposed between a truck guide rail 12 and a truck cap 14. The truck rail 12 includes a substantially horizontal mounting surface 16 and an associated downwardly extending side wall 18. The truck cap 14 is shown with a connecting portion 20.

FIG. 1 shows a common bolt 22 with a threaded portion 24 and a nut 26 for fastening the truck cap 14 and support 10 to the truck guide rail 12. Support 10 has a horizontal body portion 28 and a latch portion 30 extending from said horizontal body portion in a downward direction.

Referring now to FIG. 2, one embodiment of the support has a plurality of independent modular support segments disposed as they would be on a truck bed. The support assembly includes an elongated cross member 34 having a first end 36 and a second end 38. Configured to connect to the cross member is a pair of corner members 40 and 42 each having mating notches 44 and 45. The corner members 40 and 42 correspond and connect with notches 46 and 47 located on the first and second ends of cross member 34.

The support assembly further includes a first elongated longitudinal member 48 and a second elongated longitudinal member 50 extending along the length of the truck bed rail. The first longitudinal member 48 is configured to mate and connect with corner member 40. The second longitudinal member 50 is configured to mate and connect with corner member 42. FIG. 2 further includes a tail gate end portion 52. Some vehicles include a curved pair of truck bed end portions with the tail gate shorter than the width of the truck bed. The tail gate end portions are configured to follow the contour of the truck rail end portions not shown.

Referring now to FIGS. 1 and 2, all of the supports shown in FIG. 2 are configured such that each has a horizontal body portion 28 and a latch portion 30 as disclosed in FIG. 1. Each latch portion 30 extends down and away from the horizontal body portions 28 of the support adjacent the side wall 18 of the truck rail 12. FIG. 1 shows one embodiment of the present invention wherein the thickness of the horizontal body portion is greater than the thickness of the latch portion. Both the horizontal body portion and latch portion should be at least 0.25 of an inch in thickness. FIG. 1 also shows the support of the present invention having an external sidewall 54 noticeable when the truck rail support insert and truck cap are engaged operationally. This outer side 54 includes a precipitation run-off surface 56 which can be utilized for its aesthetic appearance by manufacturing supports in various colors to match the color scheme of the truck and truck cap combination.

Referring now to FIG. 2, the cross member 34 is shown having mating notches 46 and 47. FIG. 3 discloses a truck rail 12 and an alternative embodiment of the present invention wherein a truck liner 74 is disposed within the truck bed. The truck liner 74 has a vertical section 76 and a horizontal section 78 that follow the contour of the truck rail 12. The support 10 of the present invention is disposed between the truck rail 12 and the truck bed liner 76. As can be seen from FIG. 3, support 10 does not include an annular wall. A precipitation run off surface is not needed in the support insert of the present invention as utilized with a truck liner as shown in FIG. 3.

Figure 5:
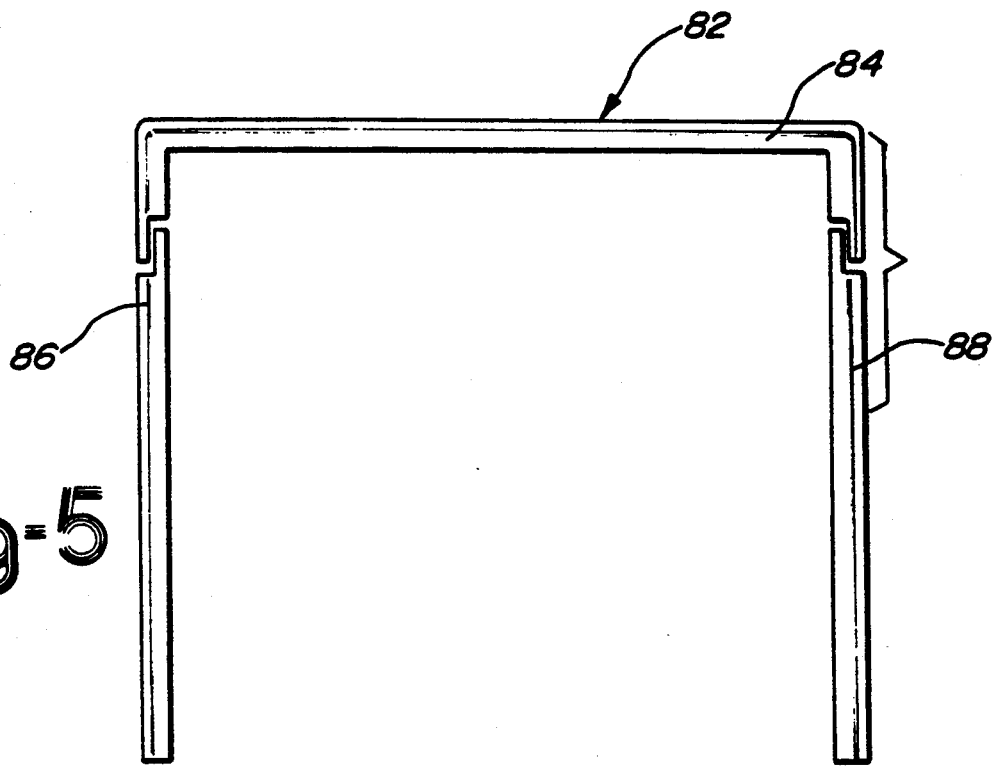
FIG. 5 is a top view of another embodiment of the present invention wherein the support insert includes three segments.

FIG. 4 shows an alternative embodiment of the present invention wherein a support insert 80 is constructed of a one piece unitary segment. In contrast, FIG. 5 shows another embodiment of the present invention wherein the support insert 82 includes three unitary segments 84, 86 and 88 comprising the entire support insert. Depending upon the variations in size of the truck beds of different vehicles, a support insert as shown in FIG. 4 would be manufactured to lengths comparable to those of the most standard vehicle truck bed. The support insert of the present invention as shown in FIGS. 2 and 5 are cost effective alternatives that allow customizing the support insert of the present invention to any custom truck bed variation.

The support inserts of the present invention as shown in FIGS. 4 and 5 include a horizontal portion and a vertical portion similar to that disclosed in FIG. 1.

While the invention has been particularly shown and described in reference to the preferred embodiment thereof, it will be understood by those skilled in the art that various changes in form and details may be made therein without departing from the spirit and scope of the invention.

What is claimed is:

1. In an open-bed truck having a pair of substantially parallel guide rails and at least one transverse guide rail disposed therebetween, each of said guide rails having a substantially horizontal mounting surface and an associated downwardly extending side wall, a modular support for providing a protective seal between said guide rails and a truck accessory, the modular support comprising:

an elongated cross-member having a substantially horizontal body portion adapted to be fixably secured to said horizontal mounting surface of said transverse guide rail and a latch portion adapted to abut said corresponding side wall, said cross member having a first end and a second end;

a pair of elongated longitudinal members, each of said longitudinal members having a substantially horizontal body portion adapted to be fixably secured respectively to each of said substantially horizontal mounting surfaces of said parallel guide rails and the latch portion adapted to abut said associated side walls, said longitudinal members further adapted to receive respective ends of said cross member to form a unitary weather tight seal between said guide rails and said truck accessory, wherein said horizontal body portion has a thickness sufficient to be visually noticeable when operatively disposed between said substantially parallel guide rails and said truck accessory.

2. A support as in claim 1 wherein the thickness of said horizontal body portion is greater than the thickness of said latch portion.

3. A support as in claim 1 wherein said pair of substantially parallel guide rails have respective end portions which curve in towards each other and said support further includes a pair of tailgate end portions configured to curve in towards each other following the contour of said end portions of said parallel guide rails.

4. The support as in claim 1 wherein said horizontal body portion has a uniform thickness of at least 0.25 inches.

5. The support as in claim 1 wherein said latch portion has a uniform thickness of at least 0.25 inches.

6. The support as in claim 1 wherein said horizontal body portion has an external side wall opposite said latch portion sloping downward toward an outer edge of said truck wall to form a precipitation run off surface.

7. The support as in claim 1 wherein said first end and second end of said elongated cross member include mating notches and said pair of elongated longitudinal members further include one mating end having corresponding mating notches.

8. The support as in claim 1 wherein said support is comprised of foam rubber.

9. The support as in claim 1 wherein said cross member is integrally formed with said pair of elongated longitudinal members.

10. In an open-bed truck having a pair of substantially parallel guide rails including respective end portions which curve in towards each other and at least one transverse guide rail disposed therebetween, each of said guide rails having a substantially horizontal mounting surface and an associated downwardly extending side wall, a modular support for providing a protective seal between said guide rails and a truck accessory, the modular support comprising:

an elongated cross-member having a substantially horizontal body portion adapted to be fixably secured to said horizontal mounting surface of said transverse guide rail and a latch portion adapted to abut said corresponding side wall, said cross member having a first end and a second end;

a pair of elongated longitudinal members, each of said longitudinal members having a substantially horizontal body portion adapted to be fixably secured respectively to each of said substantially horizontal mounting surfaces of said parallel guide rails and the latch portion adapted to abut said associated side walls, said longitudinal members further adapted to receive respective ends of said cross member to form a unitary weather tight seal between said guide rails and said truck accessory; and a pair of tailgate end portions configured to curve in towards each other following the contour of said end portions of said parallel guide rails.

11. The support as in claim 10 wherein said horizontal body portion and latch portion connect at said corner portion to form and angle in a range of about 85 to 95 degrees.

12. The support as in claim 10 wherein said horizontal body portion is thicker than said latch portion.

13. In an open-bed truck having a pair of substantially parallel guide rails and at least one transverse guide rail disposed therebetween, each of said guide rails having a substantially horizontal mounting surface and an associated downwardly extending side wall, a modular support for providing a protective seal between said guide rails and a truck accessory, the modular support comprising:

an elongated cross-member having a substantially horizontal body portion adapted to be fixably secured to said horizontal mounting surface of said transverse guide rail and a latch portion adapted to abut said corresponding side wall, said cross member having a first end and a second end;

a pair of elongated longitudinal members, each of said longitudinal members having a substantially horizontal body portion adapted to be fixably secured respectively to each of said substantially horizontal mounting surfaces of said parallel guide rails and the latch portion adapted to abut said associated side walls, said longitudinal members further adapted to receive respective ends of said cross member to form a unitary weather tight seal between said guide rails and said truck accessory, wherein said horizontal body portion has an external sidewall opposite said latch portion sloping downward toward an outer edge of said truck wall to form a precipitation run-off surface.

* * * * *